United States Patent [19]

Askew

[11] Patent Number: 5,016,290
[45] Date of Patent: May 21, 1991

[54] CLOSURE SYSTEM

[75] Inventor: Robert J. Askew, Richmond, Canada

[73] Assignee: Mustang Industries, Inc., Richmond, Canada

[21] Appl. No.: 528,994

[22] Filed: May 25, 1990

[51] Int. Cl.$^5$ .............................................. A41D 27/10
[52] U.S. Cl. ...................................... 2/270; 24/134 R
[58] Field of Search ................. 2/270, 125; 24/134 R, 24/306

[56] References Cited

U.S. PATENT DOCUMENTS

| 297,526 | 4/1884 | Lorsch | 2/270 |
|---|---|---|---|
| 526,830 | 10/1894 | Dulje | 24/134 R |
| 632,530 | 9/1899 | Lee | 24/134 R |
| 1,067,412 | 7/1913 | Eckhardt | 24/134 R |
| 1,503,567 | 8/1924 | Wallis | 24/134 R |
| 1,661,045 | 2/1928 | Lee | 24/134 R |
| 2,390,077 | 12/1945 | Grazia | 2/270 |
| 2,500,351 | 3/1950 | Farber | 2/270 |
| 2,543,217 | 2/1951 | Wolf | 24/134 R |
| 2,786,208 | 3/1957 | Oberg | 2/270 |
| 2,836,870 | 6/1958 | Shea | 24/134 R |
| 2,914,830 | 12/1959 | Peck | 24/134 R |
| 4,253,218 | 3/1981 | Gibbs | 24/134 R |
| 4,716,630 | 1/1988 | Skyba | 24/134 R |

FOREIGN PATENT DOCUMENTS

| 318427 | 2/1957 | Switzerland | 2/270 |
|---|---|---|---|
| 132099 | 9/1919 | United Kingdom | 2/270 |
| 948725 | 2/1964 | United Kingdom | 24/134 R |

*Primary Examiner*—Werner H. Schroeder
*Assistant Examiner*—Diana L. Biefeld
*Attorney, Agent, or Firm*—Townsend and Townsend

[57] ABSTRACT

A closure system for a flexible tube, for example a sleeve, a leg or the waist of a garment. The tube has an outer surface and an inner surface. There is a cord to extend around the flexible tube, between the inner and the outer surfaces. An opening in the inner surface allows passage of a first end of the cord. A releasable anchor engages the first end of the cord. There is a fixed anchor for the other or second end of the cord. Pulling on the first end of the cord with the releasable anchor released contracts the inner surface of the tube to provide a closure or seal for the tube. The closure system provides an effective seal for a leg, sleeve or waist of a garment. The seal can be achieved simply by pulling with one hand on the first end of the cord.

12 Claims, 2 Drawing Sheets

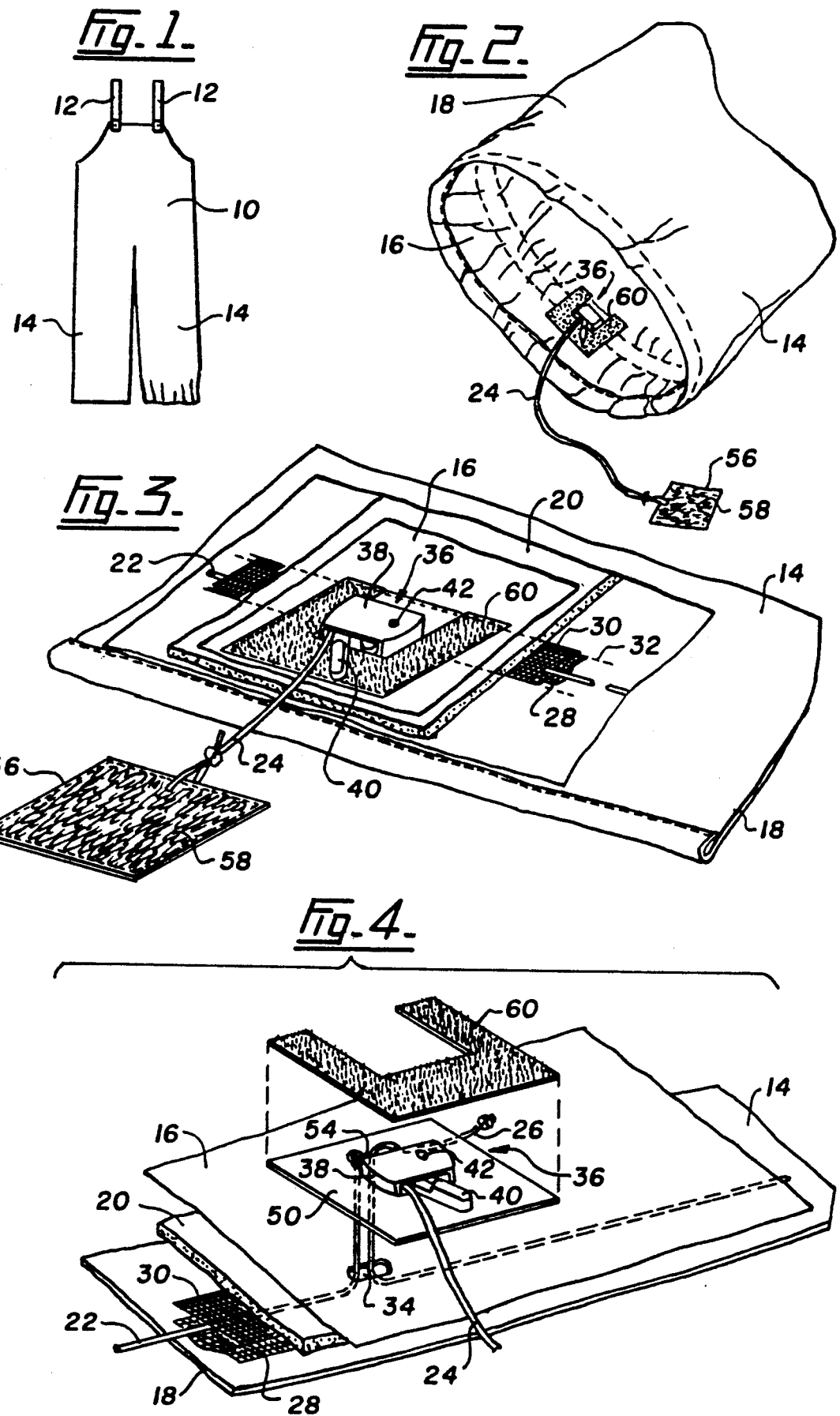

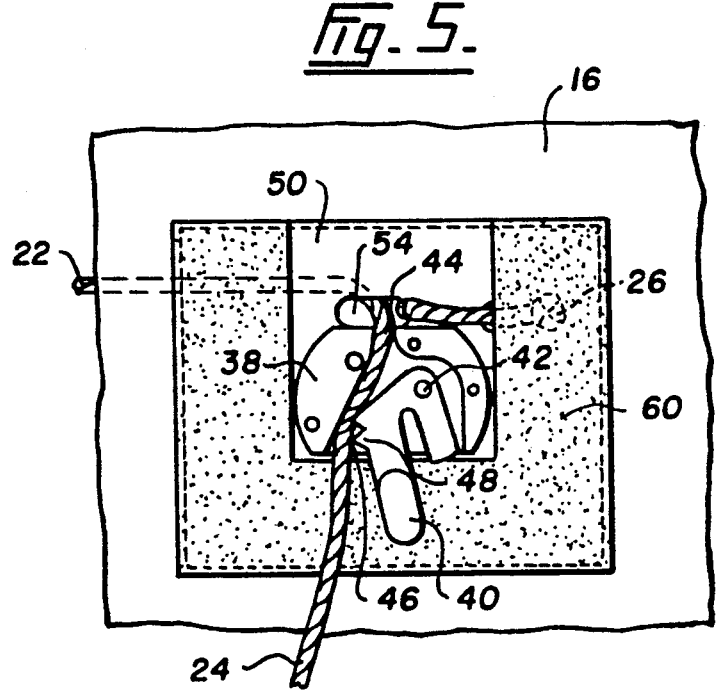

CLOSURE SYSTEM

FIELD OF THE INVENTION

This invention relates to a closure system. The closure system finds application in the closing of a flexible tube and is of value for closing the sleeve, leg or waist of a weatherproof garment, particularly garments used in adverse conditions, such as in commercial fishing.

DESCRIPTION OF THE PRIOR ART

Weatherproof garments are vital in a number of industries. Not only must the material of the garment be waterproof and windproof but it is also desirable that there be seals at such obvious points of ingress as the ends of the sleeves and the legs. Jointly owned U.S. Pat. No. 4,800,595 describes a sealing mechanism for a garment that is mounted on the exterior of the garment and can be used at the ankles, wrists, thighs, waists and chest of a garment.

In certain circumstances, the structure of the above U.S. patent can be undesirable, notably where the structure can be hit by an object and released or damaged. In those circumstances, it is desirable that the structure be concealed and protected from such possibility of damage.

SUMMARY OF THE INVENTION

The present invention provides a closure system, which is located within the garment and yet still provides an effective wind and waterproof seal.

Accordingly, the present invention provides a closure system for a flexible tube having an outer surface and an inner surface and comprising:

a cord to extend around the flexible tube, between the inner and the outer surfaces;

an opening in the inner surface through which a first end of the cord passes;

a releasable anchor to engage the first end of the cord; and a fixed anchor for the other end of the cord whereby pulling on the first end of the cord with the releasable anchor released contracts the inner surface-of the tube, the first end of the cord being that part of the cord that extends through the opening when the tube is fully contracted.

In a preferred aspect the flexible tube is a garment sleeve or leg. In a particularly preferred aspect the garment will include an insulating layer between the inner and outer surfaces but the use of this layer, which is common in the industry, does not in any way prevent mounting of the closure system of the invention nor does the closure system interfere in any material respect with the insulating ability of the insulating layer, which, typically, will be a foamed plastic.

DESCRIPTION OF THE DRAWING

The invention is illustrated in the drawings, in which:

FIG. 1 illustrates a garment to which the releasable anchor of the present invention has been attached;

FIG. 2 illustrates a detail of FIG. 1;

FIG. 3 is a more detailed view of part of FIG. 2;

FIG. 4 is an exploded view of FIG. 3; and

FIG. 5 illustrates a further detail of the invention.

DESCRIPTION OF THE PREFERRED EMBODIMENTS

FIG. 1 shows a pair of trousers 10, typically having a waterproof outer layer, for example of polyvinyl chloride, much used by commercial fishermen. There are suspenders 12 attached. The garment will be worn with an outer, waterproof jacket of similar constitution.

As shown in FIG. 1, the leg of trousers 10 is sealed, typically around a waterproof boot worn by the fishermen, by being tightened against the boot. FIGS. 2 to 5 show the means of tightening.

As shown particularly in FIGS. 3 and 4, the flexible tube 14 that makes up the leg of the trousers of FIG. 1 has an inner surface 16 and an outer surface 18. There is an insulating layer 20 between the two surfaces 16 and 18, shown as foamed plastic in FIGS. 3 and 4.

Such a structure, namely the use of an inner surface or lining 16 and an outer surface 18, typically a waterproof shell, with a foam 20 between them is entirely conventional.

According to the invention there is a cord 22 to extend around the tube 14 between the inner and outer surfaces 16 and 18. As shown particularly in FIGS. 3 and 4 the cord 22 has a first end 24 and a second or other end 26 as defined below. There are means defining a pathway for the cord, that is to locate the cord 22 between the surfaces 16 and 18. The pathway is shown in the drawings as defined by superimposed strips 28 and 30 of mesh material attached by stitching to the inner surface 16. The stitching 32 extends through the edges of both strips 28 and 30 of material and through the inner surface 16 and the cord 22 passes through the pathway thus defined. This arrangement ensures that decreasing the length of the cord in the pathway contracts the inner surface of the tube.

There is an opening 34—see FIG. 4—in the inner surface 16 through which, in the preferred illustrated embodiment, both ends 24 and 26 of the cord 22 pass. The first end of the cord is that part of the cord that protrudes through opening 34 when the flexible tube 14 is fully contracted.

There is a releasable anchor 36 for the first end 24 of the cord comprising a housing 38 with a U-shaped lever 40 pivotally attached at 42 to the housing 38. As shown in FIG. 5 there are openings 44 and 46 in the housing 38 to allow the passage of the first end 24 of the cord 22 through the housing 38. The lever 40 can move from a first position as shown in FIG. 5, where it locks the cord 22, to a second position, where it releases the cord by not intruding on the path between the openings 44 and 46 in the housing. As shown in FIG. 5 the lever is preferably provided with a serrated surface 48 to facilitate grip on the cord 22.

The lever 40 is of a resilient plastic material that tends to resile to the first position (shown in FIG. 5), with the serrated surface 48 in contact with the cord 22. However, pulling on the first end of cord 22 tends to compress the U of the U-shaped lever 40 to prevent serrations 48 digging into cord 22.

In the illustrated, preferred embodiment, the housing 38 of the releasable anchor 36 is mounted on a plate 50 with which it is integrally formed and which is attached to the inner surface 16 by stitching. There is an opening 54 in the plate 50 to align with the opening 34 in the inner lining 16 so that the cord 22 may pass through both openings 34 and 54. A fixed anchor for the second end 26 of the cord 22 is provided simply by attaching the second end to the plate. It may be wrapped around the plate 50 and tied or simply adhered to the plate 50.

There is desirably a grip 56, shown in FIGS. 2 and 3 as a flat plate, attached to the first end 24 of the cord 22 which simply facilitates gripping of the cord. However, in the preferred embodiment the grip 56 has attached to it one sheet 58 of a complementary pair of sheets of hook and loop fastener such as is readily available under the trade mark Velcro. The other sheet 60 of the complementary pair is attached to the mounting plate 50 for the releasable anchor 36, and is generally U-shaped to surround the housing 38. This arrangement is such that the grip 56 may be pressed downwardly to the plate 50 thus sealing the closure by closing the openings 34 and 54 and also providing a means of storing free cord 22. In the environment in which the trousers 10 are intended to be worn it is undesirable to have loose cords and the like protruding from garments. Accordingly, the cord 22 may be either stored above the tightened cord, within the leg of the trousers, or may be bundled up and retained in position between the two sheets 58 and 60.

The closure system of the present invention is simple to use. Before putting on the trousers the user will ensure that the trouser leg is sufficiently expanded to fit over his or her leg. If necessary the lever 40 can be depressed and the trouser leg expanded by application of inward pressure on the trouser leg which easily retracts the cord 22 into the pathway. The trousers are then donned and the cord is tightened to make the legs weatherproof by pulling on the grip 56 attached to the cord 22 at first end 24. The lever is moved automatically while the cord is pulled and when the desired degree of tightening is achieved the lever resiles to the FIG. 5 position to lock the cord 22. Free cord 22 is then bundled up and either stored inside the leg or between the plates 58 and 60. The closure system thus provides an extremely simple, durable and effective seal.

To release it is simply necessary to press on the lever 40, to move serrated part 48 of the lever away from cord 22, and pull on the garment to retract the cord 22 and expand the leg to allow the garment to be removed.

A leg of a pair of trousers has been illustrated. The invention is equally useful in sealing the arms or waist of a garment.

I claim:

1. A closure system for a flexible tube having an outer surface and an inner surface and comprising:
    a cord to extend around the flexible tube, between the inner and the outer surfaces;
    an opening in the inner surface through which a first end of the cord passes;
    a releasable anchor to engage the first end of the cord; and
    a fixed anchor for the other end of the cord whereby pulling on the first end of the cord with the releasable anchor released contracts the inner surface of the tube, the first end of the cord being that part of the cord that extends through the opening when the tube is fully contracted.

2. A closure system as claimed in claim 1 in which the flexible tube is a sleeve, leg or waist of a garment.

3. A closure system as claimed in claim 2 in which the garment includes an insulating layer between the inner and outer surfaces.

4. A closure system as claimed in claim 1 including means defining a path for the cord.

5. A closure system as claimed in claim 4 in which the means defining the pathway for the cord comprises superimposed strips of flexible material attached to the inner surface.

6. A closure system as claimed in claim 5 in which the superimposed strips are mesh layers with common stitching at each side edge attaching the mesh layers to the inner surface.

7. A closure system as claimed in claim 1 in which the releasable anchor comprises a housing;
    a lever attached to the housing;
    openings in the housing through which the cord passes;
    the lever being movable between a first position, where it locks the cord, to a second position where the cord is released.

8. A closure system as claimed in claim 7 in which the lever is formed with a serrated surface to facilitate grip on the cord to lock the cord.

9. A closure system as claimed in claim 8 in which the releasable anchor is of a resilient plastic material tending to resile to the first position.

10. A closure system as claimed in claim 7 in which the housing of the releasable anchor is mounted on a first plate attached to the inner surface;
    an opening in the first plate to align with the opening in the inner surface;
    a fixed anchor for said other end of the cord being provided by attaching the second end to the first plate.

11. A closure system as claimed in claim 10 including a second plate attached to the first end of the cord as a grip;
    one sheet of a complementary pair of sheets of hook and loop fastener attached to the second plate;
    the other sheet of said complementary pair being attached to the first plate that mounts the releasable anchor;
    whereby the closure is sealed and free cord can be stored by attaching the complementary pair of sheets.

12. A closure system as claimed in claim 1 including a grip attached to the first end of the cord.

* * * * *